UNITED STATES PATENT OFFICE.

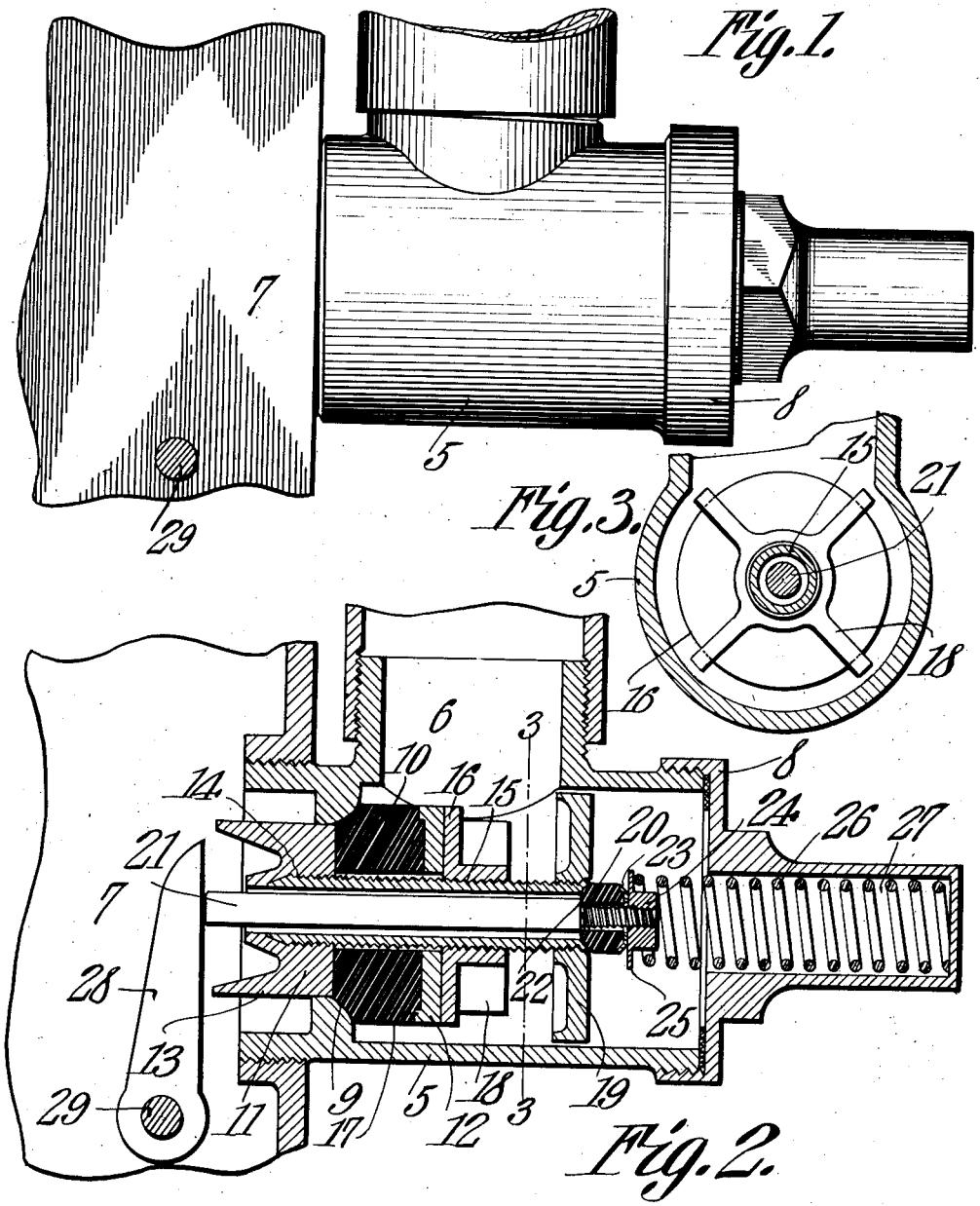

JOSEPH HUEBSCH, OF MILWAUKEE, WISCONSIN.

VALVE.

978,752.             Specification of Letters Patent.        Patented Dec. 13, 1910.

Application filed June 26, 1909.  Serial No. 504,485.

*To all whom it may concern:*

Be it known that I, JOSEPH HUEBSCH, a citizen of the United States, residing at Milwaukee, in the county of Milwaukee and State of Wisconsin, have invented a new and useful Valve, of which the following is a specification.

The present invention is designed as an improvement on the valve disclosed with my Patent No. 875,176, dated December 31, 1907, the object being to provide a valve which is easily operated, and which is so guided that it will not bind or become locked in the valve casing; and with these objects in view, the invention consists in the novel construction and arrangement of parts set forth in detail hereinafter and claimed.

The invention is illustrated in the accompanying drawing, in which,

Figure 1 is an elevation, Fig. 2 is a central longitudinal section, Fig. 3 is a transverse section on the line 3—3 of Fig. 2.

Referring more particularly to the drawings, 5 denotes the casing of the valve having a side opening 6 which is the inlet. At one of its ends, the casing screws into the delivery pipe 7, and its opposite end is closed by a screw cap 8. Adjacent to its outlet end, the wall of the valve casing is provided with an annular valve seat 9.

The valve proper is a composite structure comprising a plug 10 engageable at one of its ends with the seat 9, said end being beveled to make a good fit. The plug is preferably of rubber, and is held between a guide 11 working in the valve seat opening, and a disk 12. The guide has wings 13 which have a working fit in the valve seat opening. The guide also has the central opening 14 which is counterbored and screw threaded at that end which is contiguous to the plug 10. In the counterbore is screwed a tubular stem 15 which also extends through central openings made in the plug 10 and disk 12. The stem is threaded exteriorly throughout its entire length, and adjacent to the disk 12, it carries a disk 16 which is adapted to screw against the disk 12, whereby the latter and the valve plug 10 will be rigidly held on the stem 15, the valve plug being clamped between the guide 11 and the disk 12. That face of the disk 12 which is contiguous to the valve plug has an annular marginal flange 17, within which the reduced contiguous end of the valve plug fits, and which flange assists to hold said valve plug in place. On the back of the disk 16 are radially extending wings 18.

The stem 15 carries a plunger 19 which fits loosely in that end of the valve casing which is closed by the cap 8. The stem 15 extends through the plunger, the latter being screwed thereon, and at the back of the plunger the bore of the stem terminates in a valve seat which is engageable by a valve 20, carried by a stem 21 mounted loosely in the bore of the stem 15. This valve is a rubber plug suitably shaped at one end to fit the valve seat, and held on the stem 21 between a shoulder 22 thereon, and a cupped washer 23. The shoulder is formed by reducing the stem and this reduced end is screw threaded to receive a nut 24 engageable with the washer 23 for clamping the same against the plug 20 whereby the latter is securely held on the stem 21 against the shoulder 22. At the base of the nut 24 is an outstanding flange 25 which is engaged by one end of a coiled spring seating at its other end in an axial recess 27 formed in the cap 8, said spring serving to hold the plug 20 to its seat.

The stem 21 projects a suitable distance beyond the guide wings 13 so that it may be engaged by a trip 28 mounted on a shaft 29 fitted to turn in the delivery pipe 7, the shaft being operated in the same manner as my former patent heretofore referred to.

The plunger 19 fits sufficiently loose in the bore of the valve 20 so that the water or other fluid may leak past the same into the space behind the plunger. The plug 20 prevents the escape of this water when the valve 10 is closed. To open the valve 10, the shaft 29 is swung to bring the trip 28 into engagement with the projecting end of the stem 21, and thus to unseat the plug 20. The space behind the plunger 19 is thus vented, and the water is free to escape through the bore of the stem 15, so that there will be no pressure to oppose the opening movement of the valve 10. The trip 28 is swung until it engages the guide 11, whereupon the valve 10 is forced off its seat, the valve being thus opened more or less according to the amount of water desired, very little pressure being required to open the valve. Upon releasing the trip 28, the valve 20 is forced to its seat by the spring 26, whereupon the pressure acting to force the plunger 19 and the valve toward the seat 9 becomes greater than that opposing such movement, whereby the valve 10 is returned to its seat and closed. The plunger will move forwardly no faster than the water fills the space behind the same.

It will be seen from the foregoing that there is provided a valve which can be easily opened, and the guide wings 13 and the plunger 19 effectually prevent the valve from sticking in the valve casing, one end of the valve being guided by the wings and the other end by the plunger.

Having thus described my invention, what I claim as new and desire to protect by Letters Patent is:—

A valve comprising a casing, an annular valve seat therein, an externally threaded tubular stem in the casing, a valve engageable with the aforesaid seat, said valve comprising a plug through which the tubular stem passes, a guide for the valve mounted on one end of the tubular stem, and having wings which fit in the valve seat opening, and said guide engaging one side of the valve plug, and having a counter-bored central opening into which the tubular stem screws, a disk mounted on the tubular stem and engaging the other side of the valve plug, means for clamping said disk against the valve plug, said valve plug being held between the disk and the aforesaid guide, a plunger carried by the other end of the tubular stem, the bore of said stem opening behind the plunger, and forming a valve seat, a stem mounted in the bore of the tubular stem, and passing through the central opening of the aforesaid guide, and projecting therefrom, a valve carried by the second mentioned stem, said valve engaging the second mentioned valve seat, yielding means for normally holding the last mentioned valve seated, and means engageable with the projecting end of the second mentioned stem for unseating the valve carried thereby, and said means thereafter engaging the aforesaid guide to unseat the first mentioned valve.

In testimony that I claim the foregoing as my own, I have hereto affixed my signature in the presence of two witnesses.

JOSEPH HUEBSCH.

Witnesses:
   JOHN E. JONES,
   PAUL J. WATROUS.